US012626687B2

(12) United States Patent
Fang et al.

(10) Patent No.: US 12,626,687 B2
(45) Date of Patent: May 12, 2026

(54) SPEECH RECOGNITION METHOD, APPARATUS AND DEVICE, AND STORAGE MEDIUM

(71) Applicants: UNIVERSITY OF SCIENCE AND TECHNOLOGY OF CHINA, Hefei (CN); IFLYTEK CO., LTD., Hefei (CN)

(72) Inventors: Xin Fang, Hefei (CN); Junhua Liu, Hefei (CN)

(73) Assignees: UNIVERSITY OF SCIENCE AND TECHNOLOGY OF CHINA, Hefei (CN); IFLYTEK CO., LTD., Hefei (CN)

( * ) Notice: Subject to any disclaimer, the term of this patent is extended or adjusted under 35 U.S.C. 154(b) by 148 days.

(21) Appl. No.: 18/689,668

(22) PCT Filed: Nov. 10, 2021

(86) PCT No.: PCT/CN2021/129733
§ 371 (c)(1),
(2) Date: Mar. 6, 2024

(87) PCT Pub. No.: WO2023/035397
PCT Pub. Date: Mar. 16, 2023

(65) Prior Publication Data
US 2024/0395242 A1     Nov. 28, 2024

(30) Foreign Application Priority Data
Sep. 7, 2021     (CN) .......................... 202111042821.8

(51) Int. Cl.
G10L 15/00          (2013.01)
G10L 15/02          (2006.01)
(Continued)

(52) U.S. Cl.
CPC ............ *G10L 15/02* (2013.01); *G10L 15/063* (2013.01); *G10L 25/30* (2013.01); *G10L 15/07* (2013.01); *G10L 17/02* (2013.01); *G10L 17/04* (2013.01)

(58) Field of Classification Search
CPC ......... G10L 15/07; G10L 15/20; G10L 15/22; G10L 15/26; G10L 15/30; G10L 15/02; (Continued)

(56) References Cited

U.S. PATENT DOCUMENTS 10,957,337 B2 *   3/2021   Chen .................... G06N 3/0442
2017/0278513 A1   9/2017   Li et al.
(Continued)

FOREIGN PATENT DOCUMENTS

CN          109166586 A      1/2019
CN          109326302 A      2/2019
(Continued)

OTHER PUBLICATIONS

First Office Action received for Japanese Application No. 2024-514680, draft dated May 22, 2025.
(Continued)

*Primary Examiner* — Vu B Hang
(74) *Attorney, Agent, or Firm* — Zhong Law, LLC

(57)          ABSTRACT

Provided in the present application are a speech recognition method, apparatus and device, and a storage medium. The method comprises: acquiring a speech feature of target mixed speech and a speaker feature of a specified speaker; taking the direction of tending to a target speech feature as an extraction direction, and according to the speech feature of the target mixed speech and a speaker feature of a target speaker, extracting a speech feature of the target speaker from the speech feature of the target mixed speech, so as to obtain an extracted speech feature of the target speaker; and
(Continued)

acquiring a speech recognition result of the specified speaker according to an extracted speech feature of the specified speaker.

18 Claims, 4 Drawing Sheets

(51) Int. Cl.

| | | |
|---|---|---|
| *G10L 15/06* | (2013.01) | |
| *G10L 25/30* | (2013.01) | |
| *G10L 15/07* | (2013.01) | |
| *G10L 17/02* | (2013.01) | |
| *G10L 17/04* | (2013.01) | |

(58) Field of Classification Search
CPC ....... G10L 15/08; G10L 15/063; G10L 15/14; G10L 15/197; G10L 15/1822; G10L 15/183; G10L 15/19; G10L 15/193; G10L 15/16; G10L 19/005; G10L 19/00; G10L 25/30; G10L 25/27; G10L 15/12; G10L 17/00; G10L 17/02; G10L 17/04; G10L 17/06; G10L 15/00; G10L 2015/0631; G10L 17/18; G10L 25/51
See application file for complete search history.

(56) References Cited

U.S. PATENT DOCUMENTS

| | | | |
|---|---|---|---|
| 2018/0261225 A1 | 9/2018 | Watanabe et al. | |
| 2019/0304438 A1 | 10/2019 | Qian et al. | |
| 2020/0135209 A1* | 4/2020 | Delfarah ................ | G10L 17/04 |
| 2021/0201890 A1 | 7/2021 | Wang et al. | |
| 2022/0148571 A1 | 5/2022 | Wang et al. | |

FOREIGN PATENT DOCUMENTS

| | | |
|---|---|---|
| CN | 109874096 A | 6/2019 |
| CN | 110288989 A | 9/2019 |
| CN | 110517698 A | 11/2019 |
| CN | 110827853 A | 2/2020 |
| CN | 111128197 A | 5/2020 |
| CN | 111145736 A | 5/2020 |
| CN | 111261146 A | 6/2020 |
| CN | 111326143 A | 6/2020 |
| CN | 111433847 A | 7/2020 |
| CN | 111508505 A | 8/2020 |
| CN | 111583916 A | 8/2020 |
| CN | 111833886 A | 10/2020 |
| CN | 111899758 A | 11/2020 |
| CN | 112331181 A | 2/2021 |
| CN | 112786057 A | 5/2021 |
| CN | 113077795 A | 7/2021 |
| CN | 113221673 A | 8/2021 |
| JP | 2021039219 A | 3/2021 |

OTHER PUBLICATIONS

European search report received for EP Application No. 21956569, dated Jun. 24, 2025.

Shi Jiatong et al., Improving RNN Transducer With Target Speaker Extraction and Neural Uncertainty Estimation, Jun. 6, 2021 (Jun. 6, 2021), pp. 6908-6912.

Hao Yunzhe et al: "A Unified Framework 1, 12, 14, for Low-Latency Speaker Extraction in 15 Cocktail Party Environments", Sep. 25, 2020.

Chao Guan-Lin et al: "Deep Speaker 1, 12, 14, Embedding for Speaker-Targeted Automatic 15 Speech Recognition", Natural Language Processing and Information Retrieval,Jun. 28, 2019.

Li Wenjie et al: "TEnet: target speaker 1,12,14, extraction network with accumulated 15 speaker embedding automatic speech recognition", Jul. 11, 2019.

International Search report received for PCT Patent Application No. PCT/CN2021/129733, mailed on May 20, 2022.

Written Opinion of the International Search Authority received for PCT Patent Application No. PCT/CN2021/129733, mailed on May 20, 2022.

* cited by examiner

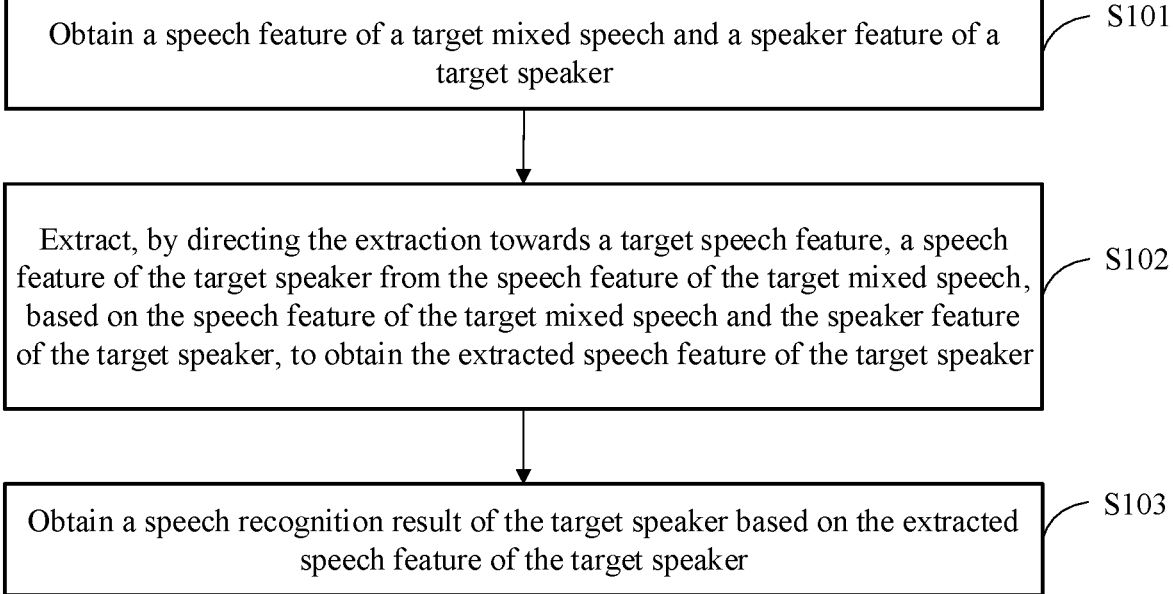

Obtain a speech feature of a target mixed speech and a speaker feature of a target speaker ⟋ S101

Extract, by directing the extraction towards a target speech feature, a speech feature of the target speaker from the speech feature of the target mixed speech, based on the speech feature of the target mixed speech and the speaker feature of the target speaker, to obtain the extracted speech feature of the target speaker ⟋ S102

Obtain a speech recognition result of the target speaker based on the extracted speech feature of the target speaker ⟋ S103

Figure 1

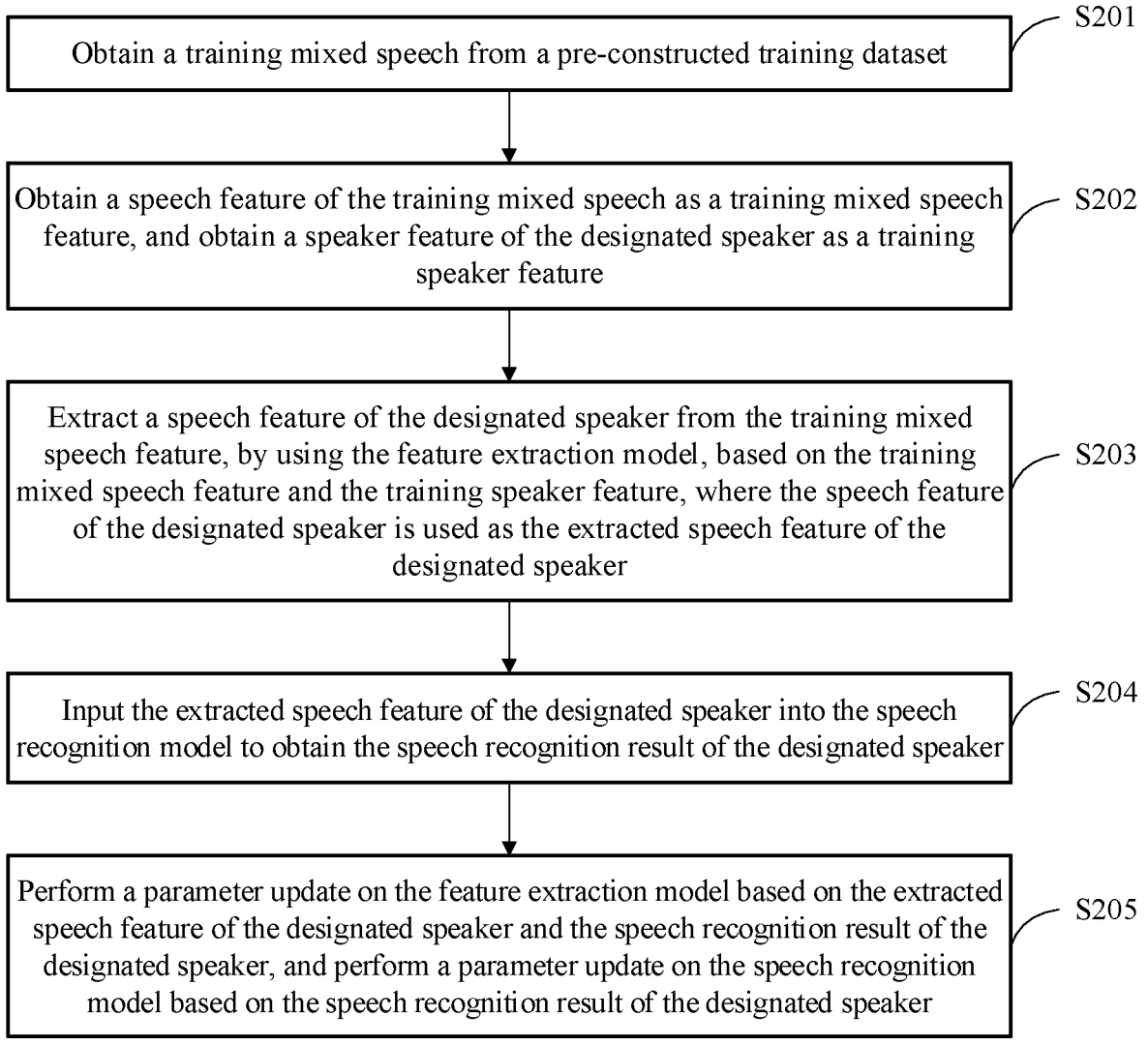

S201

Obtain a training mixed speech from a pre-constructed training dataset

S202

Obtain a speech feature of the training mixed speech as a training mixed speech feature, and obtain a speaker feature of the designated speaker as a training speaker feature

S203

Extract a speech feature of the designated speaker from the training mixed speech feature, by using the feature extraction model, based on the training mixed speech feature and the training speaker feature, where the speech feature of the designated speaker is used as the extracted speech feature of the designated speaker

S204

Input the extracted speech feature of the designated speaker into the speech recognition model to obtain the speech recognition result of the designated speaker

S205

Perform a parameter update on the feature extraction model based on the extracted speech feature of the designated speaker and the speech recognition result of the designated speaker, and perform a parameter update on the speech recognition model based on the speech recognition result of the designated speaker

Figure 2

SPEECH RECOGNITION METHOD, APPARATUS AND DEVICE, AND STORAGE MEDIUM

This application is the national phase of International Application No. PCT/CN2021/129733, titled "SPEECH RECOGNITION METHOD, APPARATUS AND DEVICE, AND STORAGE MEDIUM", filed on Nov. 10, 2021, which claims priority to Chinese Patent Application No. 202111042821.8, titled "SPEECH RECOGNITION METHOD, APPARATUS AND DEVICE, AND STORAGE MEDIUM", filed on Sep. 7, 2021 with the China National Intellectual Property Administration (CNIPA), both of which are incorporated herein by reference in their entireties.

FIELD

The present disclosure relates to the technical field of speech recognition, and in particular to a speech recognition method, a speech recognition apparatus, a speech recognition device, and a storage medium.

BACKGROUND

With the rapid development of artificial intelligence technology, smart devices are playing an increasingly important role in lives. Speech interaction, as the most convenient and natural way of human-computer interaction, is the most favored among the users.

When using a smart device, a user may be in a complex environment with speeches from others. In this case, a speech collected by the smart device is a mixed speech. In the speech interaction, there is a need to recognize speech content of a target speaker from the mixed speech, in order to obtain a better user experience. How to recognize the speech content of the target speaker from the mixed speech is a problem to be solved.

SUMMARY

In view of this, a speech recognition method, a speech recognition apparatus, a speech recognition device, and a storage medium are provided according to the present disclosure, which can more accurately recognize the speech content of a target speaker from a mixed speech. Technical solutions are described below.

A speech recognition method is provided, including:

obtaining a speech feature of a target mixed speech and a speaker feature of a target speaker;

extracting, by directing the extraction towards a target speech feature, a speech feature of the target speaker from the speech feature of the target mixed speech, based on the speech feature of the target mixed speech and the speaker feature of the target speaker, to obtain the extracted speech feature of the target speaker; where the target speech feature is a speech feature for obtaining a speech recognition result consistent with real speech content of the target speaker; and obtaining the speech recognition result of the target speaker based on the extracted speech feature of the target speaker.

In an embodiment, the obtaining the speaker feature of the target speaker includes:

obtaining a registered speech of the target speaker; and extracting a short-term voiceprint feature and a long-term voiceprint feature from the registered speech of the target speaker to obtain a multi-scale voiceprint feature as the speaker feature of the target speaker.

In an embodiment, the process of extracting, by directing the extraction towards the target speech feature, the speech feature of the target speaker from the speech feature of the target mixed speech, based on the speech feature of the target mixed speech and the speaker feature of the target speaker includes:

extracting, by using a pre-established feature extraction model, the speech feature of the target speaker from the speech feature of the target mixed speech, based on the speech feature of the target mixed speech and the speaker feature of the target speaker;

where, the feature extraction model is trained, by using a speech feature of a training mixed speech and a speaker feature of a designated speaker, with a speech recognition result obtained based on an extracted speech feature of the designated speaker as an optimization objective, where the speech feature of the training mixed speech including a speech of the designated speaker, and the extracted speech feature of the designated speaker is a speech feature of the designated speaker extracted from the speech feature of the training mixed speech.

In an embodiment, the feature extraction model is trained using both the extracted speech feature of the designated speaker and the speech recognition result obtained based on the extracted speech feature of the designated speaker as the optimization objective.

In an embodiment, the process of the extracting, by using the pre-established feature extraction model, the speech feature of the target speaker from the speech feature of the target mixed speech, based on the speech feature of the target mixed speech and the speaker feature of the target speaker includes:

inputting the speech feature of the target mixed speech and the speaker feature of the target speaker into the feature extraction model to obtain a feature mask corresponding to the target speaker; and extracting the speech feature of the target speaker from the speech feature of the target mixed speech, based on the speech feature of the target mixed speech and the feature mask corresponding to the target speaker.

In an embodiment, the process of obtaining the speech recognition result of the target speaker based on the extracted speech feature of the target speaker includes:

obtaining the speech recognition result of the target speaker based on the extracted speech feature of the target speaker and a registered speech feature of the target speaker;

where the registered speech feature of the target speaker is a speech feature of a registered speech of the target speaker.

In an embodiment, the process of obtaining the speech recognition result of the target speaker based on the extracted speech feature of the target speaker includes:

inputting a speech recognition input feature at least including the extracted speech feature of the target speaker into a pre-established speech recognition model to obtain the speech recognition result of the target speaker;

where the speech recognition model is obtained from a joint training with the feature extraction model, and the speech recognition model is trained, by using the extracted speech feature of the designated speaker, with the speech recognition result obtained based on the extracted speech feature of the designated speaker as an optimization objective.

In an embodiment, the process of inputting the speech recognition input feature into the speech recognition model to obtain the speech recognition result of the target speaker includes:

encoding the speech recognition input feature based on an encoder module in the speech recognition model to obtain an encoded result;

extracting, from the encoded result, an audio-related feature vector required for decoding at a decoding time instant, based on an attention module in the speech recognition model; and decoding the audio-related feature vector extracted from the encoded result based on a decoder module in the speech recognition model to obtain a recognition result at the decoding time instant.

In an embodiment, the process of the joint training of the speech recognition model and the feature extraction model includes:

extracting, by using the feature extraction model, the speech feature of the designated speaker from the speech feature of the training mixed speech, to obtain the extracted speech feature of the designated speaker;

obtaining the speech recognition result of the designated speaker by using the speech recognition model and the extracted speech feature of the designated speaker;

performing a parameter update on the feature extraction model based on the extracted speech feature of the designated speaker and the speech recognition result of the designated speaker; and performing a parameter update on the speech recognition model based on the speech recognition result of the designated speaker.

In an embodiment, the training mixed speech corresponds to a speech of the designated speaker; and the process of performing the parameter update on the feature extraction model based on the extracted speech feature of the designated speaker and the speech recognition result of the designated speaker, and performing the parameter update on the speech recognition model based on the speech recognition result of the designated speaker includes:

obtaining an annotated text of the speech of the designated speaker;

obtaining a speech feature of the speech of the designated speaker as a standard speech feature of the designated speaker;

determining a first prediction loss based on the extracted speech feature of the designated speaker and the standard speech feature of the designated speaker;

determining a second prediction loss based on the speech recognition result of the designated speaker and the annotated text of the speech of the designated speaker; and performing the parameter update on the feature extraction model based on the first prediction loss and the second prediction loss; and performing the parameter update on the speech recognition model based on the second prediction loss.

In an embodiment, the training mixed speech and the speech of the designated speaker corresponding to the training mixed speech are obtained from a pre-constructed training dataset; and a construction process of the training dataset includes:

obtaining multiple speeches from multiple speakers, where each speech is a speech from a single speaker and has an annotated text;

using each speech of part or all of the multiple speeches as the speech of the designated speaker;

mixing the speech of the designated speaker with one or more speeches of the multiple speakers other than the designated speaker in remaining of the multiple speeches to obtain the training mixed speech;

determining the speech of the designated speaker and the training mixed speech obtained from mixing as a piece of training data; and forming the training dataset with multiple obtained pieces of training data.

A speech recognition apparatus is provided, including a feature obtaining module, a feature extraction module and a speech recognition module; where the feature obtaining module is configured to obtain a speech feature of a target mixed speech and a speaker feature of a target speaker;

the feature extraction module is configured to extract, by directing an extraction towards a target speech feature, a speech feature of the target speaker from the speech feature of the target mixed speech, based on the speech feature of the target mixed speech and the speaker feature of the target speaker, to obtain the extracted speech feature of the target speaker; where the target speech feature is a speech feature for obtaining a speech recognition result consistent with real speech content of the target speaker; and the speech recognition module is configured to obtain the speech recognition result of the target speaker based on the extracted speech feature of the target speaker.

In an implementation, the feature obtaining module includes a speaker feature obtaining module; where the speaker feature obtaining module is configured to obtain a registered speech of the target speaker, extract a short-term voiceprint feature and a long-term voiceprint feature from the registered speech of the target speaker to obtain a multi-scale voiceprint feature as the speaker feature of the target speaker.

In an embodiment, the feature extraction module is further configured to extract, by using a pre-established feature extraction model, the speech feature of the target speaker from the speech feature of the target mixed speech, based on the speech feature of the target mixed speech and the speaker feature of the target speaker;

where the feature extraction model is trained, by using a speech feature of a training mixed speech and a speaker feature of a designated speaker, with a speech recognition result obtained based on an extracted speech feature of the designated speaker as an optimization objective, where the speech feature of the training mixed speech including a speech of the designated speaker, and the extracted speech feature of the designated speaker is a speech feature of the designated speaker extracted from the speech feature of the training mixed speech.

In an embodiment, the speech recognition module is further configured to obtain the speech recognition result of the target speaker based on the extracted speech feature of the target speaker and a registered speech feature of the target speaker;

where the registered speech feature of the target speaker is a speech feature of a registered speech of the target speaker.

In an implementation, the speech recognition module is further configured to input a speech recognition input feature at least including the extracted speech feature of the target speaker into a pre-established speech recognition model to obtain the speech recognition result of the target speaker;

where the speech recognition model is obtained from a joint training with the feature extraction model, and the speech recognition model is trained, by using the extracted speech feature of the designated speaker, with the speech recognition result obtained based on the extracted speech feature of the designated speaker as an optimization objective.

A speech recognition device is provided, including a memory and a processor;

where the memory is configured to store a program; and the processor is configured to execute the program to implement the speech recognition method according to any of the above embodiments.

A computer readable storage medium storing a computer program thereon is provided, where the computer program, when executed by a processor, implements the speech recognition method according to any of the above embodiments.

From the above solutions, with the speech recognition method, the speech recognition apparatus, the speech recognition device, and storage medium provided in the present disclosure, the speech feature of the target speaker can be extracted from the speech feature of the target mixed speech based on the speech feature of the target mixed speech and the speaker feature of the target speaker, thereby the speech recognition result of the target speaker can be obtained based on the extracted speech feature of the target speaker. Since in the present disclosure, when extracting the speech feature of the target speaker from the speech feature of the target mixed speech, the extraction is directed towards the target speech feature (the speech feature used to obtain the speech recognition result consistent with the real speech content of the target speaker), therefore, the extracted speech feature is either the target speech feature or the speech feature similar to the target speech feature. It can be seen that the speech feature extracted through such method is beneficial to speech recognition. The speech recognition based on such speech feature can yield excellent speech recognition result, i.e., more accurate speech recognition result, leading to a better user experience.

BRIEF DESCRIPTION OF THE DRAWINGS

For clearer illustration of the technical solutions according to embodiments of the present disclosure or conventional techniques, hereinafter briefly described are the drawings to be applied in embodiments of the present disclosure or conventional techniques. Apparently, the drawings in the following descriptions are only some embodiments of the present disclosure, and other drawings may be obtained by those skilled in the art based on the provided drawings without any creative effort.

FIG. 1 is a schematic flowchart of a speech recognition method according to an embodiment of the present disclosure;

FIG. 2 is a schematic flowchart of a joint training of a feature extraction model and a speech recognition model according to an embodiment of the present disclosure;

DETAILED DESCRIPTION

Figure 3:
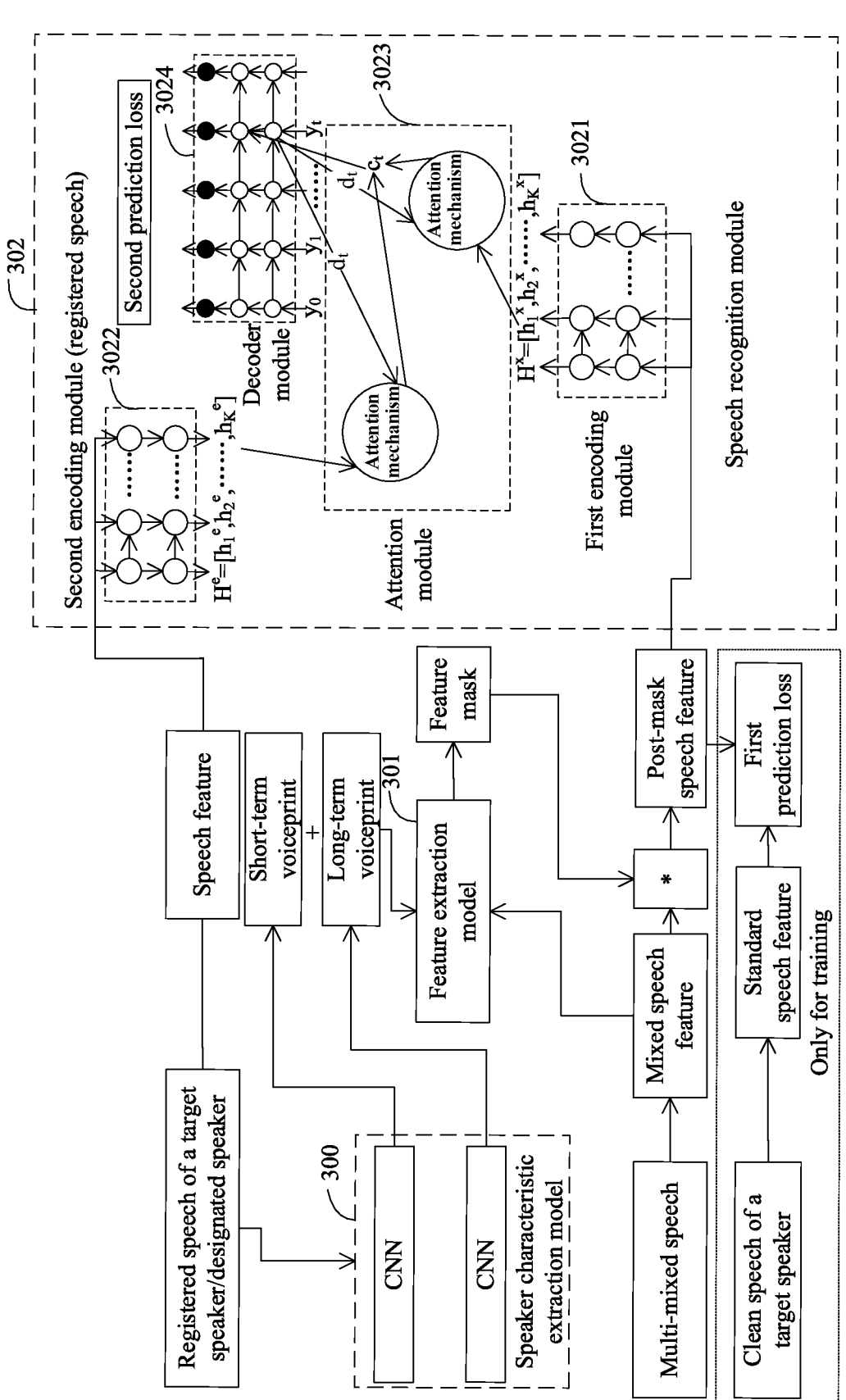
FIG. 3 is a schematic diagram of a process of a joint training of a feature extraction model and a speech recognition model according to an embodiment of the present disclosure.

Hereinafter technical solutions of embodiments of the present disclosure are described clearly and completely in conjunction with the drawings of the embodiments of the present disclosure. Apparently, the embodiments described below are only some embodiments, rather than all the embodiments of the present disclosure. Any other embodiments obtained by those skilled in the art based on the embodiments in the present disclosure without any creative effort shall fall within the protection scope of the present disclosure.

In an external environment, a user is usually surrounded by various sound sources, such as sounds of multiple speakers speaking at the same time, traffic noise, and natural noise, etc. With efforts of researchers, the background noise separation problem, which in the common meaning is the speech enhancement problem, is well solved. In contrast, when multiple speakers speaking at the same time, how to recognize speech content of a target speaker, i.e., how to recognize the speech content of the target speaker from a mixed speech, is more difficult and has more research significance.

In order to realize recognizing the speech content of the target speaker from the mixed speech, the applicant initially researches under the following idea: pre-training a feature extraction model and then a speech recognition model; obtaining a registered speech of the target speaker, and extracting a d-vector from the registered speech of the target speaker as a speaker feature of the target speaker; and extracting, through the pre-trained feature extraction model, a speech feature of the target speaker from a speech feature of a target mixed speech based on the speaker feature of the target speaker and the speech feature of the target mixed speech; performing a series of transformation on the extracted speech feature of the target speaker to obtain a speech of the target speaker; and inputting the speech of the target speaker into the pre-trained speech recognition model for speech recognition to obtain a speech recognition result of the target speaker.

The applicant found, through researches, that the above idea mainly has the following aspects of defects. Firstly, the d-vector extracted for the registered speech of the target speaker contains insufficient voiceprint information, which compromises the effect of subsequent feature extraction. Secondly, the feature extraction model and the speech recognition model are trained independently. Therefore, they are isolated from each other and cannot realize an efficient joint optimization. Cascading the two independently trained models for speech recognition may cause cascading errors, which compromises the effect of the speech recognition. Thirdly, in a case where a feature extracted at the feature extraction part, i.e., the front-end, is defective, there is no remedy at the speech recognition part, i.e., the back-end, which may lead to an unsatisfied effect of the speech recognition.

Based on the above-mentioned concept and the defects thereof, the applicant digs deep into those issues and finally proposes a speech recognition method that can overcome the above-mentioned defects. With this speech recognition method, speech content of a target speaker can be more accurately recognized from a mixed speech. The speech recognition method can be applied to a terminal with data processing capabilities. The terminal may recognize the speech content of the target speaker from the target mixed speech according to the speech recognition method provided in the present disclosure. The terminal may include a processing component, a memory, an input/output interface and a power supply component. Alternatively, the terminal may further include a multimedia component, an audio component, a sensor component, a communication component, and the like.

The processing component is configured for data processing. A speech synthesis processing in the present solution may be performed by the processing component. The processing component may include one or more processors. The processing component may further include one or more modules to facilitate interaction with other components.

The memory is configured to store various types of data. The memory may be implemented with any type of volatile or non-volatile storage device or a combination thereof. For example, the memory is one or more of a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, an optical disk, and the like.

The power supply component is configured to supply power to various components of the terminal. The power supply component may include a power management system, one or more power supplies, and the like.

The multimedia component may include a screen. In a preferred embodiment, the screen may be a touch screen, and the touch screen may receive an input signal from a user. The multimedia component may further include a front-facing camera and/or a rear-facing camera.

The audio component is configured to output and/or input an audio signal. For example, the audio component may include a microphone. The microphone is configured to receive an external audio signal. The audio component may further include a speaker. The speaker is configured to output an audio signal. A synthesized speech by the terminal may be outputted through the speaker.

The input/output interface is an interface between the processing component and a peripheral interface module. The peripheral interface module may be a keyboard, a button, and the like. The buttons may include but is not limited to a home button, a volume button, a start button, a lock button, and the like.

The sensor component may include one or more sensors for providing various state assessments for the terminal. For example, the sensor component may detect an open/closed state of the terminal, whether a user is in contact with the terminal, an orientation, speed, temperature of the apparatus, and the like. The sensor component may include, but is not limited to, one or more of: an image sensor, an acceleration sensor, a gyroscope sensor, a pressure sensor, a temperature sensor, and the like.

The communication component is configured to facilitate a wired or wireless communication between the terminal and other devices. The terminal may access a wireless network based on communication standards, such as one or more of WiFi, 2G, 3G, 4G, and 5G.

In an embodiment, the terminal may be implemented by one or more application specific integrated circuits (ASICs), digital signal processors (ASPs), digital signal processing devices (DSPDs), programmable logic devices (PLDs), field programmable gate arrays (FPGAs), controllers, micro-controllers, microprocessors or other electronic components for executing the method provided in the present disclosure.

The speech recognition method provided in the present disclosure may be further applied to a server. The server may recognize the speech content of the target speaker from the target mixed speech according to the speech recognition method provided in the present disclosure. In a scenario, the server may be connected to the terminal through a network. The terminal obtains the target mixed speech, and transmits the target mixed speech to the server through the network connected to the server. The server recognizes the speech content of the target speaker from the target mixed speech according to the speech recognition method provided in the present disclosure, and then transmits the speech content of the target speaker to the terminal through the network. The server may include one or more central processing units and a memory. Where, the memory is configured to store various types of data. The memory may be implemented with any type of volatile or non-volatile storage device or a combination thereof. For example, the memory is one or more of a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, an optical disk, and the like. The server may further include one or more power supplies, one or more wired network interfaces and/or one or more wireless network interfaces, and one or more operating systems.

Hereinafter, the speech recognition method provided in the present disclosure is described through embodiments as follows.

First Embodiment

Reference is made to FIG. 1. FIG. 1 is a schematic flowchart of a speech recognition method according to an embodiment of the present disclosure. The method may include steps S101 to S103.

In step S101, a speech feature of a target mixed speech and a speaker feature of a target speaker are obtained.

Where, the target mixed speech refers to a speech of multiple speakers, including the speech of the target speaker as well as speeches of other speakers. In the present disclosure, it is intended to achieve more accurate recognition of speech content of a target speaker in a case that there are speeches of other speakers.

The process of obtaining the speech feature of the target mixed speech includes: obtaining a feature vector (e.g., a spectrum feature) of each speech frame in the target mixed speech to obtain a feature vector sequence, and determining the obtained feature vector sequence as the speech feature of the target mixed speech. Assuming that the target mixed speech includes K speech frames and the feature vector of the k-th speech frame is expressed as $x_k$, the speech feature of the target mixed speech may be expressed as $$[x_1, x_2, \ldots, x_k, \ldots, x_K].$$

The speaker feature of the target speaker may be obtained through various implementations, and two alternatives thereof are provided here. In a first implementation, a registered speech of the target speaker may be obtained, and a d-vector is extracted from the registered speech of the target speaker as the speaker feature of the target speaker. Given that voiceprint information contained in the d-vector is relatively simple and not enriched enough, another preferred implementation is provided in order to improve the effect of subsequent feature extraction. In the implementation, the registered speech of the target speaker is obtained, a short-term voiceprint feature and a long-term voiceprint feature are extracted from the registered speech of the target speaker to obtain a multi-scale voiceprint feature as the speaker feature of the target speaker.

Compared with the speaker feature obtained through the first implementation, the speaker feature obtained through the second implementation includes enriched voiceprint information, which enables subsequent feature extraction using the speaker feature obtained through the second implementation. Hence, a better effect of the feature extraction can be achieved.

In the following description of the second implementation, a specific process of "extracting the short-term voiceprint feature and the long-term voiceprint feature from the registered speech of the designated speaker" is described.

The process of extracting the short-term voiceprint feature and the long-term voiceprint feature from the registered speech of the target speaker may include: extracting the short-term voiceprint feature and the long-term voiceprint feature from the registered speech of the target speaker by using a pre-established speaker feature extraction model. In an implementation, a speech feature sequence of the registered speech of the target speaker is obtained, and the speech feature sequence of the registered speech of the target speaker is inputted into the pre-established speaker characteristic extraction model to obtain the short-term voiceprint feature and the long-term voiceprint feature of the target speaker.

In an implementation, the speaker characteristic extraction model may use a convolutional neural network. The speech feature sequence of the registered speech of the target speaker is inputted into the convolutional neural network for feature extraction, so as to obtain a shallow feature and a deep feature. The shallow feature has a smaller receptive field and therefore can better represent the short-term voiceprint. Hence, the shallow feature is regarded as the short-term voiceprint feature. The deep feature has a larger receptive field and therefore can better represent the long-term voiceprint. Hence, the deep feature is regarded as the long-term voiceprint feature.

The speaker characteristic extraction model in the embodiment is obtained from training by using a large number of training speeches with real speaker labels (the training speeches here are preferably speeches of a single speaker), where the real speaker label of the training speeches represents a speaker corresponding to the training speeches. In an implementation, the cross entropy (CE) criterion or the metric learning (ML) criterion may be applied to train the speaker characteristic extraction model.

In step S102, a speech feature of the target speaker is extracted from the speech feature of the target mixed speech, by directing an extraction towards a target speech feature, based on the speech feature of the target mixed speech and the speaker feature of the target speaker, so that an extracted speech feature of the target speaker is obtained.

Where, the target speech feature is a speech feature for obtaining a speech recognition result consistent with real speech content of the target speaker.

While directing an extraction towards a target speech feature, the speech feature extracted from the speech feature of the target mixed speech is the target speech feature or similar to the target speech feature. In other words, while directing an extraction towards a target speech feature, a speech feature beneficial to subsequent speech recognition can be extracted from the speech feature of the target mixed speech. The speech recognition based on the speech feature beneficial to the speech recognition can realize a better effect of the speech recognition.

In an implementation, the process of extracting a speech feature of the target speaker from the speech feature of the target mixed speech, by directing an extraction towards a target speech feature, based on the speech feature of the target mixed speech and the speaker feature of the target speaker, to obtain an extracted speech feature of the target speaker, may include: extracting the speech feature of the designated speaker from the target mixed speech feature, by using a pre-established feature extraction model, based on the target mixed speech feature and the target speaker feature, to obtain the extracted speech feature of the target speaker.

Where, in the feature extraction model, a speech feature of each training mixed speech and a speaker feature of a designated speaker are used, where each training mixed speech contains a speech of the designated speaker. By using the above features, the feature extraction model is trained with a speech recognition result obtained based on the extracted speech feature of the designated speaker as an optimization objective. It should be noted that during the training, an input to the feature extraction model is the above-mentioned speech feature of the training mixed speech and the speaker feature of the designated speaker, and an output is the speech feature of the designated speaker extracted from the corresponding training mixed speech feature.

In an implementation, during the training of the feature extraction model, the optimization objective is based on the speech recognition result obtained from the extracted speech feature of the designated speaker. Since the feature extraction model is trained with the speech recognition result obtained based on the extracted speech feature of the designated speaker as an optimization objective, the speech feature that is beneficial for speech recognition can be extracted from the mixed speech feature based on the feature extraction model.

In order to improve the effect of the feature extraction, in another implementation, in the training of the feature extraction model, the optimization objective is the extracted speech feature of the designated speaker and the speech recognition result obtained based on the extracted speech feature of the designated speaker. By using the extracted speech feature of the designated speaker and the speech recognition result obtained based on the extracted speech feature of the designated speaker both as the optimization objective, the speech feature extracted from the mixed speech feature based on the feature extraction model can be beneficial to speech recognition and approach the standard speech feature of the designated speaker. It should be noted that the standard speech feature of the target speaker refers to a speech feature obtained based on a speech (clean speech) of the designated speaker.

In step S103, a speech recognition result of the target speaker is obtained based on the extracted speech feature of the target speaker.

There are various implementations of obtaining the speech recognition result of the target speaker based on the extracted speech feature of the target speaker: In an implementation, the speech recognition result of the target speaker may be obtained based only on the extracted speech feature of the target speaker. In order to improve the effect of the speech recognition, in another implementation, the speech recognition result of the target speaker may be obtained based on the extracted speech feature of the target speaker and the registered speech feature of the target speaker (where the registered speech feature of the target speaker refers to the speech feature of the registered speech of the target speaker). Where, the registered speech feature of the target speaker is used as auxiliary information for recognition, in order to improve the effect of the speech recognition.

In an implementation, the speech recognition result of the target speaker may be obtained by using a pre-established speech recognition model. The extracted speech feature of the target speaker is used as an input feature for speech recognition. Alternatively, the extracted speech feature of the target speaker and the registered speech feature of the target speaker are used as the input features for speech recognition, and the input feature for speech recognition is inputted into the pre-established speech recognition model to obtain the speech recognition result of the target speaker.

It should be noted that in a case where the extracted speech feature of the target speaker and the registered speech feature of the target speaker are inputted to the speech recognition model as the input features for speech recognition, the registered speech feature of the target speaker can assist the speech recognition model in the speech recognition when the extracted speech feature of the target speaker is inaccurate, thereby improving the effect of the speech recognition.

In a preferred implementation, the speech recognition model may be obtained from a joint training with the feature extraction model. The speech recognition model is trained, by using the extracted speech feature of the designated speaker as a training sample, with the speech recognition result obtained based on the extracted speech feature of the designated speaker as an optimization objective. The feature extraction model and the speech recognition model are jointly trained, so that the feature extraction model can be optimized in a direction of facilitating speech recognition.

The speech recognition method provided in the present embodiment can extract the speech feature of the target speaker from the speech feature of the target mixed speech. Consequently, based on the extracted speech feature of the target speaker, the speech recognition result of the target speaker can be obtained. Since in this embodiment, when extracting the speech feature of the target speaker from the speech feature of the target mixed speech, the extraction is directed towards the target speech feature (the speech feature used to obtain a speech recognition result consistent with the real speech content of the target speaker), therefore, the extracted speech feature is either the target speech feature or the speech feature similar to the target speech feature. The speech recognition based on such speech feature can yield excellent speech recognition result, i.e., more accurate speech recognition result, leading to a better user experience.

Second Embodiment

As mentioned in the above embodiment, the feature extraction model for extracting the speech feature of the target speaker from the speech feature of the target mixed speech and the speech recognition model for obtaining the speech recognition result of the target speaker based on the feature extracted through the feature extraction model can be obtained from a joint training. In this embodiment, the process of the joint training of the feature extraction model and the speech recognition model is described in detail.

Hereinafter, the description of the process of the joint training of the feature extraction model and the speech recognition model is provided on the basis of FIG. 2 and FIG. 3. The process of the joint training of the feature extraction model and the speech recognition model may include steps S201 to S205.

In step S201, a training mixed speech $s_m$ is obtained from a pre-constructed training dataset S.

Where, the training dataset S includes multiple pieces of training data. Each piece of training data includes a speech (clean speech) of a designated speaker and a training mixed speech including the speech of the designated speaker. The speech of the designated speaker includes an annotated text (where, the annotated text is the speech content of the speech of the designated speaker).

A construction of the training dataset includes the following steps a1 to a3.

In step a1, multiple speeches of multiple speakers are obtained.

Each of the multiple speech obtained in this step is from a single speaker, and each speech has an annotated text. Assuming that the speech of the speaker has the content of "The weather is good today", the annotated text of the speech "<s>, The, weather, is, good, today, </s>", in which "<s>" is a symbol for starting a sentence and "</s>" is a symbol for ending the sentence.

It should be noted that the quantity of the multiple speeches may be the same as or different from the quantity of the speakers corresponding to the multiple speeches. Assuming that Q speeches of P speakers are obtained in step a1, a relationship between P and Q may be P=Q (for example, one speech of speaker a, one speech of speaker b, and one speech of speaker c are obtained), or P<Q (for example, two speeches of speaker a, one speech of speaker b, and three speeches of speaker c are obtained), that is, for each speaker, one or more speeches may be obtained from the speaker.

In step a2, each speech of part or all of the multiple speeches is used as the speech of the designated speaker; the speech of the designated speaker is mixed with one or more speeches of other speakers in other speech(s) to obtain a training mixed speech, and the speech of the designated speaker and the training mixed speech are determined as a piece of training data.

For example, the multiple speeches obtained include one speech of speaker a, one speech of speaker b, one speech of speaker c, and one speech of speaker d. Each speech here is a clean speech from a single speaker. The speech of speaker a may be used as the speech of the designated speaker, and other speeches of other speakers (one or more speakers) may be mixed with the speech of speaker a to obtain a training mixed speech. For example, the speech of speaker b is mixed with the speech of speaker a, or the speech of speaker b, the speech of speaker c are mixed with the speech of speaker a. The speech of speaker a and the training mixed speech obtained by mixing the speech of speaker a with the speeches of the other speakers are determined as one piece of training data. Similarly, the speech of speaker b may be used as the speech of the designated speaker, and the speeches of other speakers (one or more speakers) may be mixed with the speech of speaker b to obtain a training mixed speech. The speech of speaker b and the training mixed speech obtained by mixing the speech of speaker b with the speeches of other speakers are determined as one piece of training data. Multiple pieces of training data can be obtained in this way.

It should be noted that when mixing the speech of the designated speaker with the speech of other speakers, in a case where a length of the speech of a speaker is different from a length of the speech of the designated speaker, the speech of the speaker is required to be processed into a same length as the speech of the designated speaker. It is assumed that the speech of the designated speaker includes K speech frames, i.e., the length of the speech of the designated speaker is K. In a case where the length of the speech of a speaker is greater than K, the (K+1)-th speech frame and subsequent speech frames in the speech of this speaker may be deleted, i.e., only the first K speech frames are retained. In a case where a length of the speech of a speaker is less than K, assumed as L, (K–L) speech frames are copied from the beginning and appended to the end of the speech to fill up for the shortfall.

In step a3, the training dataset is formed by all the obtained training data.

In step S202, a speech feature of the training mixed speech $s_m$ is obtained as a training mixed speech feature $X_m$, and a speaker feature of the designated speaker is obtained as a training speaker feature.

As described in the first embodiment, the speaker characteristic extraction model may be pre-established. The speaker feature may be extracted from the registered speech of the designated speaker by using the pre-established speaker feature extraction model, and the extracted speaker feature is used as the training speaker feature. As shown in FIG. 3, a short-term voiceprint feature and a long-term voiceprint feature are extracted from the registered speech of the designated speaker by using the speaker characteristic extraction model 300. The extracted short-term voiceprint feature and the long-term voiceprint feature are used as the speaker feature of the designated speaker.

It should be noted that the speaker characteristic extraction model is pre-trained before the joint training of the feature extraction model and the speech recognition model. During the joint training of the feature extraction model and the speech recognition model, parameters of the speaker characteristic extraction model are fixed and are not updated along with the feature extraction model and the speech recognition model.

In step S203, a speech feature of the designated speaker is extracted from the training mixed speech feature $X_m$, by using the feature extraction model, based on the training mixed speech feature $X_m$ and the training speaker feature, where the speech feature of the designated speaker is used as the extracted speech feature $\overline{X_t}$ of the designated speaker.

In an implementation, the training mixed speech feature $X_m$ and the training speaker feature are inputted to the feature extraction model to obtain the feature mask M corresponding to the designated speaker. Then, based on the feature mask M corresponding to the designated speaker, the speech feature of the designated speaker is extracted from the training mixed speech feature $X_m$ as the extracted speech feature $\overline{X_t}$ of the designated speaker.

As shown in FIG. 3, the training mixed speech feature $X_m$ and the training speaker feature are inputted into the feature extraction model 301. The feature extraction model 301 determines the feature mask M corresponding to the designated speaker based on the inputted training mixed speech feature $X_m$ and the training speaker feature, and outputs the feature mask M. The feature extraction model 301 in this embodiment may be, but is not limited to, a recurrent neural network (RNN), a convolutional neural network (CNN), or a deep neural network (DNN), etc.

It should be noted that the training mixed speech feature $X_m$ represents a feature vector sequence [$x_{m1}$, $x_{m2}$, . . . , $x_{mk}$, . . . , $x_{mK}$] composed of feature vectors of speech frames in the training mixed speech, where K represents a total quantity of the speech frames in the training mixed speech.

When inputting the training mixed speech feature $X_m$ and the training speaker feature into the feature extraction model 301, the training speaker feature may be concatenated with each feature vector of the speech frames in the training mixed speech and then inputted into the feature extraction model 301. For example, the feature vector of each speech frame in the training mixed speech is 40-dimensional, and each of the short-term voiceprint feature and the long-term voiceprint feature in the training speaker feature is 40-dimensional. Therefore, after concatenating the feature vector of each speech frame in the training mixed speech with the short-term voiceprint feature and the long-term voiceprint feature, a concatenated feature vector of 120 dimensions can be obtained. When extracting the speech feature of the designated speaker in combination with the short-term voiceprint feature and the long-term voiceprint feature, it can increase the richness of input information, which can enable the feature extraction model to better extract the speech feature of the designated speaker.

In this embodiment, the feature mask M corresponding to the designated speaker may represent a proportion of the speech feature of the designated speaker in the training mixed speech feature $X_m$. In a case that the training mixed speech feature $X_m$ is represented as [$x_{m1}$, $x_{m2}$, . . . , $x_{mk}$, . . . , $x_{mK}$] and the feature mask M corresponding to the designated speaker is represented as [$m_1$, $m_2$, . . . , $m_k$, . . . , $m_K$], $m_1$ represents a proportion of the speech feature of the designated speaker in $x_{m1}$, $m_2$ represents a proportion of the speech feature of the designated speaker in $x_{m2}$, and so on. That is, $m_K$ represents a proportion of the speech feature of the designated speaker in $x_{mK}$, where $m_1$ to $m_K$ are in a range of [0,1]. After the feature mask M corresponding to the designated speaker is obtained, the training mixed speech feature $X_m$ is multiplied by the feature mask M corresponding to the designated speaker frame by frame to obtain the speech feature $\overline{X_t}=[X_{t1}, X_{t2}, . . . , X_{tk}, . . . , X_{tK}]$ of the designated speaker extracted from the training mixed speech feature $X_m$.

In step S204, the extracted speech feature $\overline{X_t}$ of the designated speaker is inputted into the speech recognition model to obtain the speech recognition result $T_t$ of the designated speaker.

In a preferred implementation, in order to improve a recognition performance of the speech recognition model, it may obtain a registered speech feature (which refers to a speech feature of the registered speech of the designated speaker) $Xe=[x_{e1}, x_{e2}, . . . , x_{ek}, . . . , x_{eK}]$ of the designated speaker. In addition to inputting the extracted speech feature $\overline{X_t}$ of the designated speaker into the speech recognition model, the registered speech feature $X_e$ of the designated speaker is inputted into the speech recognition model, which can assist the speech recognition model in speech recognition.

In an implementation, the speech recognition model in this embodiment may include an encoder module, an attention module, and a decoder module.

Where, the encoder module is configured to: encode the extracted speech feature $\overline{X_t}$ of the designated speaker to obtain an encoded result $H^x=[h_1{}^x, h_2{}^x, . . . , h_K{}^x]$ for $\overline{X_t}$; and encode the registered speech feature $X_e$ of the designated speaker to obtain an encoded result $H^e=[h_1{}^x, h_2{}^x, . . . , h_K{}^e]$ for $X_e$. It should be noted that in a case that only the extracted speech feature $\overline{X_t}$ of the designated speaker is inputted into the speech recognition model, the encoder module is only required to encode the extracted speech feature $\overline{X_t}$ of the designated speaker.

Described hereinafter are implementations in a case where the inputs to the encoder module includes the extracted speech feature $\overline{X_t}$ of the designated speaker and the registered speech features $X_e$ of the designated speaker. In an implementation, the encoder module may be provided with two encoding modules. As shown in FIG. 3, the encoder module is provided with a first encoding module 3021 and a second encoding module 3022. Where, the first encoding module 3021 is configured to encode the extracted speech feature $\overline{X_t}$ of the designated speaker, and the second encoding module is configured to encode the registered speech feature $X_e$ of the designated speaker. In another implementation, the encoder module is provided with a single encoding module. The encoding module encodes the extracted speech feature $\overline{X_t}$ of the designated speaker and encodes the registered speech feature $X_e$ of the designated speaker, that is, the two encoding processes are performed by a same encoding module. In a case where the input to the encoder module only includes the extracted speech feature $\overline{X_t}$ of the designated speaker, the encoder module is required to provide with only one encoding module. Regardless of whether one encoding module or two encoding modules are provided in the encoder module, each encoding module may include one or more encoding layers. Each encoding layer may employ unidirectional or bidirectional long short-term memory layer from long short-term memory neural network, or a convolutional layer from the convolutional neural network.

The attention module is configured to extract an audio-related feature vector required for decoding at a decoding time instant from the encoded result $H^x$ of the extracted speech feature $\overline{X_t}$ of the designated speaker and the encoded result of the registered speech feature $X_e$ of the designated speaker, respectively.

The decoding module is configured to decode the audio-related feature vector(s) extracted through the attention module to obtain a recognition result at the decoding time instant.

As shown in FIG. 3, at each decoding time instant, the attention module 3023 extracts, based on an attention mechanism, the audio-related feature vectors required for the current decoding time instant from the encoded result $H^x=[h_1^x, h_2^x, \ldots, h_K^x]$ of $\overline{X_t}$ and the encoded result $H^e=[h_1^e, h_2^e, \ldots, h_K^e]$ for $X_e$. For the t-th decoding time instant, the extracted audio-related feature vectors represent audio content of to-be-decoded characters at the t-th decoding time instant.

It should be noted that the attention mechanism refers to: performing attention mechanism operations on a set of feature vector sequences by using a vector as a query term, and selecting a feature vector that best matches the query term as an output. In an embodiment, a matching coefficient is calculated for the query term and each feature vector in the feature vector sequence, and then the matching coefficients are multiplied with corresponding feature vectors and summed to obtain a new feature vector as the feature vector that best matches the query term.

For the t-th decoding time instant, the attention module 3023 uses a state feature vector $d_t$ of the decoder module 3024 as the query term, calculates the matching coefficients $w_1^x, w_2^x, \ldots, w_K^x$ for $d_t$ and feature vectors in $H^x= [h_1^x, h_2^x, \ldots, h_K^x]$, and then multiplies the matching coefficients $w_1^x, w_2^x, \ldots, w_K^x$ with corresponding feature vectors in $H^x=[h_1^x, h_2^x, \ldots, h_K^x]$ and then sums them up. The summed feature vector is the audio-related feature vector $c_t^x$. Similarly, the attention module 3023 calculates matching coefficients $w_1^e, w_2^e, \ldots, w_K^e$ for $d_t$ and feature vectors in $H^e=[h_1^e, h_2^e, \ldots, h_K^e]$, and then multiplies the matching coefficients $w_1^e, w_2^e, \ldots, w_K^e$ with corresponding feature vectors in $H^e=[h_1^e, h_2^e, \ldots, h_K^e]$ and then sums them up. The summed feature vector is the audio-related feature vector $c_t^e$. The audio-related feature vectors $c_t^x$ and $c_t^e$, after obtained, are inputted into the decoder module 3024 for decoding, to obtain the recognition result at the t-th decoding time instant.

Where, the state feature vector $d_t$ of decoder module 3024 is determined based on a recognition result $y_{t-1}$ and $c_{t-1}^x$ and $c_{t-1}^e$ outputted by the attention module at the (t–1)-th decoding time instant. In an implementation, the decoder module 3024 may include multiple neural network layers, such as two unidirectional long short-term memory layers. At the t-th decoding time instant, a first long short-term memory layer of the decoder module 3024 calculates the state feature vector de of the decoder by using the recognition result $y_{t-1}$ and the $C_{t-1}^x$ and $c_{t-1}^e$ outputted by the attention module 3023 at the (t–1)-th decoding time instant as an input. The $d_t$ is then inputted into the attention module 3023 for calculating the $c_t^x$ and $c_t^e$ at the t-th decoding time instant. Then the $c_t^x$ and $c_t^e$ are concatenated and the concatenated vector is used as an input to a second long short-term memory layer of the decoder module 3024 (for example, the $c_t^x$ and $c_t^e$ are both 128-dimensional vectors, and concatenating the $c_t^x$ and $c_t^e$ obtains a 256-dimensional concatenated vector, which is inputted into the second long short-term memory layer of the decoder module 3024). The decoder module calculates and outputs $h_t^d$. Finally, a posterior probability of the output character is calculated based on $h_t^d$, and the recognition result at the t-th decoding time instant is determined based on the posterior probability of the output character.

In step S205, a parameter update is performed on the feature extraction model based on the extracted speech feature $\overline{X_t}$ of the designated speaker and the speech recognition result $\overline{T_t}$ of the designated speaker, and a parameter update is performed on the speech recognition model based on the speech recognition result $\overline{T_t}$ of the designated speaker.

In an implementation, the process of step S205 may include steps S2051 to S2053 as follows.

In step S2051, an annotated text $T_t$ of a speech $s_t$ of the designated speaker (a speech of the designated speaker) corresponding to the training mixed speech $s_m$ is obtained, and the speech feature of the speech $s_t$ of the designated speaker is obtained as a standard speech feature $X_t$ of the designated speaker.

It should be noted that the speech $s_t$ of the designated speaker here is different from the registered speech of the designated speaker mentioned above.

In step S2052, a first prediction loss Loss1 is determined based on the extracted speech feature $\overline{X_t}$ of the designated speaker and the standard speech feature $X_t$ of the designated speaker, and a second prediction loss Loss2 is determined based on the speech recognition result $\overline{T_t}$ of the designated speaker and the annotated text $T_t$ of the speech $s_t$ of the designated speaker speech.

In an embodiment, the first prediction loss Loss1 may be calculated as a minimum mean square error between the extracted speech feature $\overline{X_t}$ of the designated speaker and the standard speech feature $X_t$ of the designated speaker; and the second prediction loss Loss2 may be calculated as a cross entropy loss based on the speech recognition result $\overline{T_t}$ of the designated speaker and the annotated text $T_t$ of the speech $s_t$ of the designated speaker.

In step S2053, the parameter update is performed on the feature extraction model based on the first prediction loss Loss1 and the second prediction loss Loss2; and the parameter update is performed on the speech recognition model based on the second prediction loss Loss2.

With the parameter update on the feature extraction model based on the first prediction loss Loss1 and the second prediction loss Loss2, the speech feature extracted from the training mixed speech feature through the feature extraction model can be similar to the standard speech feature of the designated speaker and conducive to the speech recognition. Inputting such speech feature into the speech recognition model for speech recognition can obtain a better effect of the speech recognition.

Third Embodiment

On the basis of the above embodiments, the process of "extracting the speech feature of the designated speaker from the target mixed speech feature, by using a pre-established feature extraction model, based on the target mixed speech feature and the target speaker feature, to obtain the extracted speech feature of the target speaker" as mentioned in the first embodiment is described hereinafter.

The process of extracting the speech feature of the designated speaker from the target mixed speech feature, by using a pre-established feature extraction model, based on the target mixed speech feature and the target speaker feature, to obtain the extracted speech feature of the target speaker, may include steps b1 to b2 as follows.

In step b1, the speech feature of the target mixed speech and the speaker feature of the target speaker are inputted into the feature extraction model to obtain a feature mask corresponding to the target speaker.

Where, the feature mask corresponding to the target speaker may represent a proportion of the speech feature of the target speaker in the speech feature of the target mixed speech.

In step b2, the speech feature of the target speaker is extracted from the speech feature of the target mixed speech based on the feature mask corresponding to the target speaker, to obtain the extracted speech feature of the target speaker.

In an implementation, the speech feature of the target mixed speech and the feature mask corresponding to the target speaker are multiplied frame by frame to obtain the extracted speech feature of the target speaker.

After the extracted speech feature of the target speaker is obtained, the extracted speech feature of the target speaker and the registered speech feature of the target speaker are inputted into the speech recognition model to obtain the speech recognition result of the target speaker. In an implementation, the process of inputting the extracted speech feature of the target speaker and the registered speech feature of the target speaker into the speech recognition model to obtain the speech recognition result of the target speaker may include steps c1 to c3 as follows.

In step c1, based on an encoder module in the speech recognition model, the extracted speech feature of the target speaker and the registered speech feature of the target speaker are encoded, to obtain two encoded results.

In step c2, based on an attention module in the speech recognition model, an audio-related feature vector required for decoding at a decoding time instant is extracted from each of the two encoded results.

In step c3, based on a decoder module in the speech recognition model, the audio-related feature vector extracted from the two encoded results are decoded, to obtain a recognition result at the decoding time instant.

It should be noted that the process of inputting the extracted speech feature of the target speaker into the speech recognition model to obtain the speech recognition result of the target speaker is similar to the process of inputting the extracted speech feature of the designated speaker and the registered speech feature of the designated speaker into the speech recognition model in the training to obtain the speech recognition result of the designated speaker. For specific implementations of steps c1 to c3, reference may be made to the description of the encoder module, the attention module and the decoder module in the second embodiment, which are not repeated here.

According to the first to third embodiments, the speech recognition method provided in the present disclosure offers advantages as follows. Firstly, multi-scale voiceprint features are extracted from the registered speech of the target speaker and inputted into the feature extraction model. This increases the richness of input information for the feature extraction model, thereby enhancing the effectiveness of the feature extraction of the feature extraction model. Secondly, the joint training of the feature extraction model and the speech recognition model allows the prediction loss of the speech recognition model to influence the feature extraction model. This enables the feature extraction model to extract the speech feature beneficial for speech recognition, thereby improving the accuracy of the speech recognition result. Thirdly, the speech feature of the registered speech of the target speaker is utilized as an additional input to the speech recognition model. This assists the speech recognition model in recognizing speech when the extracted speech feature through the feature extraction model is not optimal, resulting in a more accurate speech recognition result. As described above, the speech recognition method provided in the present disclosure can accurately recognize the speech content of target speaker under conditions of complex speech interference.

Fourth Embodiment

A speech recognition apparatus is further provided according to an embodiment of the present disclosure. The speech recognition apparatus provided in the embodiment is described below. The speech recognition apparatus described below and the speech recognition method described above may be mutually referenced.

Figure 4:
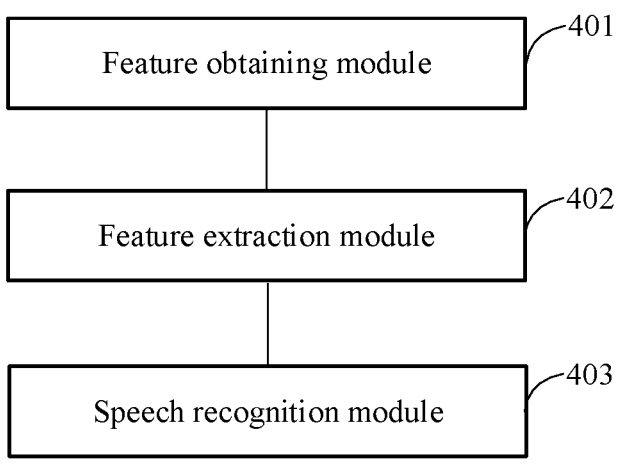
FIG. 4 is a schematic structural diagram of a speech recognition apparatus according to an embodiment of the present disclosure.

Reference is made to FIG. 4. FIG. 4 illustrates a schematic structural diagram of a speech recognition apparatus according to an embodiment of the present disclosure. The speech recognition apparatus may include a feature obtaining module 401, a feature extraction module 402 and a speech recognition module 403.

The feature obtaining module 401 is configured to obtain a speech feature of a target mixed speech and a speaker feature of a target speaker.

The feature extraction module 402 is configured to extract, by directing an extraction towards a target speech feature, a speech feature of the target speaker from the speech feature of the target mixed speech, based on the speech feature of the target mixed speech and the speaker feature of the target speaker, to obtain the extracted speech feature of the target speaker; where the target speech feature is a speech feature for obtaining a speech recognition result consistent with real speech content of the target speaker.

The speech recognition module 403 is configured to obtain the speech recognition result of the target speaker based on the extracted speech feature of the target speaker.

In an implementation, the feature obtaining module 401 includes a speech feature obtaining module and a speaker feature obtaining module.

The speech feature obtaining module is configured to obtain a speech feature of a target mixed speech.

The speaker feature obtaining module is configured to obtain a speaker feature of a target speaker.

In an implementation, when obtaining the speaker feature of the target speaker, the speaker feature obtaining module is further configured to obtain a registered speech of the target speaker, and extract a short-term voiceprint feature and a long-term voiceprint feature from the registered speech of the target speaker to obtain a multi-scale voiceprint feature as the speaker feature of the target speaker.

In an implementation, the feature extraction module 402 is further configured to extract, by using a pre-established feature extraction model, the speech feature of the target speaker from the speech feature of the target mixed speech, based on the speech feature of the target mixed speech and the speaker feature of the target speaker.

Where, the feature extraction model is trained, by using a speech feature of a training mixed speech and a speaker feature of a designated speaker, with a speech recognition result obtained based on an extracted speech feature of the designated speaker as an optimization objective; where the speech feature of the training mixed speech including a speech of the designated speaker, and the extracted speech feature of the designated speaker is a speech feature of the designated speaker extracted from the speech feature of the training mixed speech.

In an implementation, the feature extraction model is trained using both the extracted speech feature of the designated speaker and the speech recognition result obtained based on the extracted speech feature of the designated speaker as the optimization objective.

In an implementation, the feature extraction module 402 includes a feature mask determination sub-module and a speech feature extraction sub-module.

The feature mask determination sub-module is configured to input the speech feature of the target mixed speech and the speaker feature of the target speaker into the feature extraction model to obtain a feature mask corresponding to the target speaker. Where, the feature mask can represent a proportion of the speech feature of the speaker in the speech feature of the target mixed speech.

The speech feature extraction sub-module is configured to extract the speech feature of the target speaker from the speech feature of the target mixed speech, based on the speech feature of the target mixed speech and the feature mask corresponding to the target speaker.

In an implementation, the speech recognition module 403 is further configured to obtain the speech recognition result of the target speaker based on the extracted speech feature of the target speaker and a registered speech feature of the target speaker; where the registered speech feature of the target speaker is a speech feature of a registered speech of the target speaker.

In an implementation, the speech recognition module 403 is further configured to input a speech recognition input feature at least including the extracted speech feature of the target speaker into a pre-established speech recognition model to obtain the speech recognition result of the target speaker.

Where, the speech recognition model is obtained from a joint training with the feature extraction model, and the speech recognition model is trained, by using the extracted speech feature of the designated speaker, with the speech recognition result obtained based on the extracted speech feature of the designated speaker as an optimization objective.

In an implementation, in the process of inputting the speech recognition input feature at least including the extracted speech feature of the target speaker into the pre-established speech recognition model to obtain the speech recognition result of the target speaker, the speech recognition module 403 is further configured to: encode the speech recognition input feature based on an encoder module in the speech recognition model to obtain an encoded result; extract, from the encoded result, an audio-related feature vector required for decoding at a decoding time instant, based on an attention module in the speech recognition model; and decode the audio-related feature vector extracted from the encoded result based on a decoder module in the speech recognition model to obtain a recognition result at the decoding time instant.

In an implementation, the speech recognition apparatus provided in the embodiment of the present disclosure may further include a model training module. The model training module may include an extracted speech feature obtaining module, a speech recognition result obtaining module, and a parameter update module.

The extracted speech feature obtaining module is configured to extract, by using the feature extraction model, the speech feature of the designated speaker from the speech feature of the training mixed speech, to obtain the extracted speech feature of the designated speaker.

The speech recognition result obtaining module is configured to obtain the speech recognition result of the designated speaker by using the speech recognition model and the extracted speech feature of the designated speaker.

The model update module is configured to perform a parameter update on the feature extraction model based on the extracted speech feature of the designated speaker and the speech recognition result of the designated speaker, and perform a parameter update on the speech recognition model based on the speech recognition result of the designated speaker.

In an embodiment, the model update module may include an annotated text obtaining module, a standard speech feature obtaining module, a prediction loss determination module and a parameter update module.

The training mixed speech corresponds to a speech of the designated speaker.

The standard speech feature obtaining module is configured to obtain a speech feature of the speech of the designated speaker as a standard speech feature of the designated speaker.

The annotated text obtaining module is configured to obtain an annotated text of the speech of the designated speaker.

The prediction loss determination module is configured to determine a first prediction loss based on the extracted speech feature of the designated speaker and the standard speech feature of the designated speaker, and determine a second prediction loss based on the speech recognition result of the designated speaker and the annotated text of the speech of the designated speaker.

The parameter update module is configured to perform the parameter update on the feature extraction model based on the first prediction loss and the second prediction loss, and perform the parameter update on the speech recognition model based on the second prediction loss.

In an embodiment, the training mixed speech and the speech of the designated speaker corresponding to the training mixed speech are obtained from a pre-constructed training dataset. The speech recognition apparatus provided in an embodiment of the present disclosure may further include a training dataset construction module.

The training dataset construction module is configured to: obtain multiple speeches from multiple speakers, where each speech is a speech from a single speaker and has an annotated text; use each speech of part or all of the multiple speeches as the speech of the designated speaker; mix the speech of the designated speaker with one or more speeches of the multiple speakers other than the designated speaker in remaining of the multiple speeches to obtain the training mixed speech; determine the speech of the designated speaker and the training mixed speech obtained from mixing as a piece of training data; and form the training dataset with multiple obtained such pieces of training data.

The speech recognition apparatus provided in the embodiment of the present disclosure can extract the speech feature of the target speaker from the speech feature of the target mixed speech. Consequently, based on the extracted speech feature of the target speaker, the speech recognition result of the target speaker can be obtained. Since in this embodiment, when extracting the speech feature of the target speaker from the speech feature of the target mixed speech, the extraction is directed towards the target speech feature (the speech feature used to obtain a speech recognition result consistent with the real speech content of the target speaker), therefore, the extracted speech feature is either the target speech feature or the speech feature similar to the target speech feature. The speech recognition based on such speech feature can yield excellent speech recognition result, i.e., more accurate speech recognition result, leading to a better user experience.

Fifth Embodiment

Figure 5:
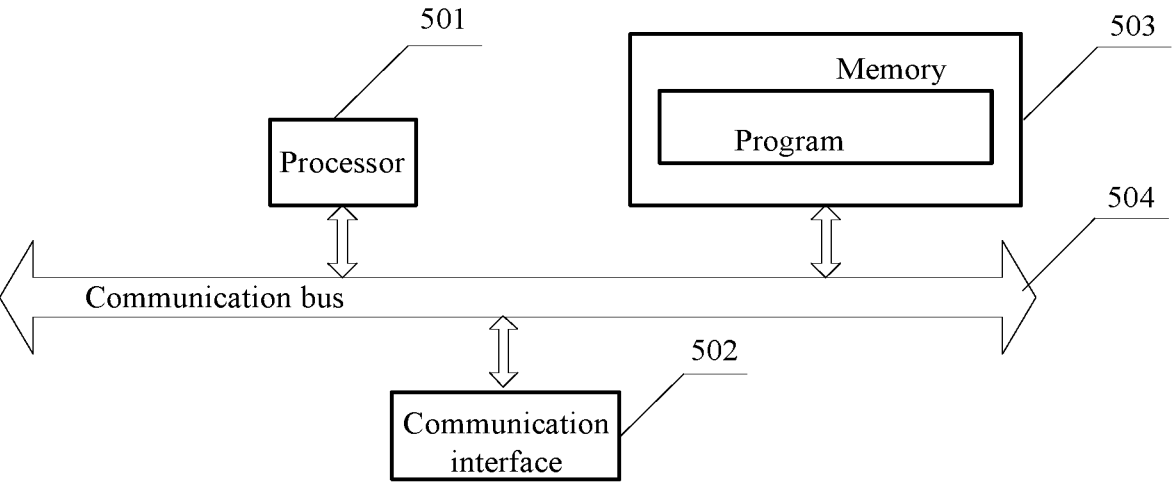
FIG. 5 is a schematic structural diagram of a speech recognition device according to an embodiment of the present disclosure.

A speech recognition device is further provided in an embodiment of the present disclosure. Reference is made to FIG. 5. FIG. 5 illustrates a schematic structural diagram of a speech recognition device. The speech recognition device may include at least one processor 501, at least one communication interface 502, at least one memory 503 and at least one communication bus 504.

In this embodiment of the present disclosure, there are at least one processor 501, at least one communication interface 502, at least one memory 503, and at least one communication bus 504. The processor 501, the communication interface 502, and the memory 503 perform communication with each other via the communication bus 504.

The processor 501 may be a central processing unit CPU, or an application specific integrated circuit (ASIC), or one or more integrated circuits configured to implement embodiments of the present disclosure, or the like.

The memory 503 may include a high-speed RAM memory, and may further include a non-volatile memory, and the like, such as at least one disk memory.

Where, the memory stores a program, and the processor may invoke the program stored in the memory. The program is for:

obtaining a speech feature of a target mixed speech and a speaker feature of a target speaker;

extracting, by directing the extraction towards a target speech feature, a speech feature of the target speaker from the speech feature of the target mixed speech, based on the speech feature of the target mixed speech and the speaker feature of the target speaker, to obtain the extracted speech feature of the target speaker; where the target speech feature is a speech feature for obtaining a speech recognition result consistent with real speech content of the target speaker; and obtaining the speech recognition result of the target speaker based on the extracted speech feature of the target speaker.

Alternatively, detailed functions and extended functions of the program may refer to the above description.

Sixth Embodiment

A readable storage medium is further provided in an embodiment of the present disclosure. The readable storage medium may store a program suitable for execution by a processor. The program is for:

obtaining a speech feature of a target mixed speech and a speaker feature of a target speaker;

extracting, by directing the extraction towards a target speech feature, a speech feature of the target speaker from the speech feature of the target mixed speech, based on the speech feature of the target mixed speech and the speaker feature of the target speaker, to obtain the extracted speech feature of the target speaker; where the target speech feature is a speech feature for obtaining a speech recognition result consistent with real speech content of the target speaker; and obtaining the speech recognition result of the target speaker based on the extracted speech feature of the target speaker.

Alternatively, detailed functions and extended functions of the program may refer to the above description.

It should be further noted that in the present disclosure, the relationship terminologies such as "first" and "second" are only used to distinguish one entity or operation from another entity or operation, rather than to necessitate or imply that the actual relationship or order exists between the entities or operations. In addition, terms of "include", "comprise" or any other variants are intended to be non-exclusive. Therefore, a process, method, article or device including a series of elements includes not only the elements but also other elements that are not enumerated, or further includes the elements inherent for the process, method, article or device. Unless expressively limited otherwise, the statement "comprising (including) one . . . " does not exclude existence of other similar elements in the process, method, article or device.

The embodiments in the present disclosure are described in a progressive manner, and each of the embodiments focuses on its differences from the other embodiments. The same or similar parts among the embodiments may be referred to each other.

The above description of the disclosed embodiments enables those skilled in the art to implement or use the present disclosure. Various modifications to the embodiments are apparent to those skilled in the art, and the generic principles defined herein may be practiced in other embodiments without departing from the spirit or scope of the present disclosure. Hence, the present disclosure is not to be limited to the embodiments shown herein but is to be conformed with the widest scope consistent with the principles and novel features disclosed herein.

The invention claimed is:

1. A speech recognition method, comprising:

obtaining a speech feature of a target mixed speech and a speaker feature of a target speaker;

extracting, by directing the extraction towards a target speech feature, a speech feature of the target speaker from the speech feature of the target mixed speech, based on the speech feature of the target mixed speech and the speaker feature of the target speaker, to obtain the extracted speech feature of the target speaker, wherein the target speech feature is a speech feature for obtaining a speech recognition result consistent with real speech content of the target speaker; and obtaining the speech recognition result of the target speaker based on the extracted speech feature of the target speaker; wherein a feature extraction model and a speech recognition model are pre-established, and joint training is performed on the speech recognition model and the feature extraction model;

wherein the joint training performed on the speech recognition model and the feature extraction model further comprises:

extracting, by using the feature extraction model, the speech feature of the designated speaker from the speech feature of the training mixed speech, to obtain the extracted speech feature of the designated speaker, wherein the training mixed speech corresponds to a speech of the designated speaker;

obtaining the speech recognition result of the designated speaker by using the speech recognition model and the extracted speech feature of the designated speaker;

obtaining an annotated text of the speech of the designated speaker;

obtaining a speech feature of the speech of the designated speaker as a standard speech feature of the designated speaker;

determining a first prediction loss based on the extracted speech feature of the designated speaker and the standard speech feature of the designated speaker;

determining a second prediction loss based on the speech recognition result of the designated speaker and the annotated text of the speech of the designated speaker;

performing the parameter update on the feature extraction model based on the first prediction loss and the second prediction loss; and performing the parameter update on the speech recognition model based on the second prediction loss.

2. The speech recognition method according to claim 1, wherein the obtaining the speaker feature of the target speaker comprises:

obtaining a registered speech of the target speaker; and extracting a short-term voiceprint feature and a long-term voiceprint feature from the registered speech of the target speaker to obtain a multi-scale voiceprint feature as the speaker feature of the target speaker.

3. The speech recognition method according to claim 1, wherein the extracting, directing the extraction towards the target speech feature, the speech feature of the target speaker from the speech feature of the target mixed speech, based on the speech feature of the target mixed speech and the speaker feature of the target speaker further comprises:

extracting, by using the pre-established feature extraction model, the speech feature of the target speaker from the speech feature of the target mixed speech, based on the speech feature of the target mixed speech and the speaker feature of the target speaker;

wherein, the feature extraction model is trained, by using a speech feature of a training mixed speech and a speaker feature of a designated speaker, with a speech recognition result obtained based on an extracted speech feature of the designated speaker as an optimization objective, wherein the speech feature of the training mixed speech comprising a speech of the designated speaker, and the extracted speech feature of the designated speaker is a speech feature of the designated speaker extracted from the speech feature of the training mixed speech.

4. The speech recognition method according to claim 3, wherein the feature extraction model is trained using both the extracted speech feature of the designated speaker and the speech recognition result obtained based on the extracted speech feature of the designated speaker as the optimization objective.

5. The speech recognition method according to claim 3, wherein the extracting, by using the pre-established feature extraction model, the speech feature of the target speaker from the speech feature of the target mixed speech, based on the speech feature of the target mixed speech and the speaker feature of the target speaker further comprises:

inputting the speech feature of the target mixed speech and the speaker feature of the target speaker into the feature extraction model to obtain a feature mask corresponding to the target speaker; and extracting the speech feature of the target speaker from the speech feature of the target mixed speech, based on the speech feature of the target mixed speech and the feature mask corresponding to the target speaker.

6. The speech recognition method according to claim 1, wherein obtaining the speech recognition result of the target speaker based on the extracted speech feature of the target speaker further comprises:

obtaining the speech recognition result of the target speaker based on the extracted speech feature of the target speaker and a registered speech feature of the target speaker;

wherein the registered speech feature of the target speaker is a speech feature of a registered speech of the target speaker.

7. The speech recognition method according to claim 3, wherein obtaining the speech recognition result of the target speaker based on the extracted speech feature of the target speaker further comprises:

inputting a speech recognition input feature at least comprising the extracted speech feature of the target speaker into the pre-established speech recognition model to obtain the speech recognition result of the target speaker;

wherein the speech recognition model is trained, by using the extracted speech feature of the designated speaker, with the speech recognition result obtained based on the extracted speech feature of the designated speaker as an optimization objective.

8. The speech recognition method according to claim 7, wherein inputting the speech recognition input feature into the speech recognition model to obtain the speech recognition result of the target speaker further comprises:

encoding the speech recognition input feature based on an encoder module in the speech recognition model to obtain an encoded result;

extracting, from the encoded result, an audio-related feature vector required for decoding at a decoding time instant, based on an attention module in the speech recognition model; and decoding the audio-related feature vector extracted from the encoded result based on a decoder module in the speech recognition model to obtain a recognition result at the decoding time instant.

9. The speech recognition method according to claim 1, wherein the training mixed speech and the speech of the designated speaker corresponding to the training mixed speech are obtained from a pre-constructed training dataset; and a construction of the training dataset comprises:

obtaining a plurality of speeches from a plurality of speakers, wherein each speech is a speech from a single speaker and has an annotated text;

using each speech of part or all of the plurality of speeches as the speech of the designated speaker;

mixing the speech of the designated speaker with one or more speeches of the plurality of speakers other than the designated speaker in remaining of the plurality of speeches to obtain the training mixed speech;

determining the speech of the designated speaker and the training mixed speech obtained from mixing as a piece of training data; and forming the training dataset with a plurality of obtained pieces of training data.

10. A speech recognition apparatus, comprising a feature obtaining module, a feature extraction module and a speech recognition module, wherein the feature obtaining module is configured to obtain a speech feature of a target mixed speech and a speaker feature of a target speaker;

the feature extraction module is configured to extract, by directing an extraction towards a target speech feature, a speech feature of the target speaker from the speech feature of the target mixed speech, based on the speech feature of the target mixed speech and the speaker feature of the target speaker, to obtain the extracted speech feature of the target speaker; wherein the target speech feature is a speech feature for obtaining a speech recognition result consistent with real speech content of the target speaker; and the speech recognition module is configured to obtain the speech recognition result of the target speaker based on the extracted speech feature of the target speaker; wherein a feature extraction model and a speech recognition model are pre-established, and joint training is performed on the speech recognition model and the feature extraction model;

wherein the joint training performed on the speech recognition model and the feature extraction model further comprises:

extracting, by using the feature extraction model, the speech feature of the designated speaker from the speech feature of the training mixed speech, to obtain the extracted speech feature of the designated speaker, wherein the training mixed speech corresponds to a speech of the designated speaker;

obtaining the speech recognition result of the designated speaker by using the speech recognition model and the extracted speech feature of the designated speaker;

obtaining an annotated text of the speech of the designated speaker;

obtaining a speech feature of the speech of the designated speaker as a standard speech feature of the designated speaker;

determining a first prediction loss based on the extracted speech feature of the designated speaker and the standard speech feature of the designated speaker;

determining a second prediction loss based on the speech recognition result of the designated speaker and the annotated text of the speech of the designated speaker;

performing the parameter update on the feature extraction model based on the first prediction loss and the second prediction loss; and performing the parameter update on the speech recognition model based on the second prediction loss.

11. The speech recognition apparatus according to claim 10, wherein the feature obtaining module comprises:

a speaker feature obtaining module, configured to obtain a registered speech of the target speaker; and extract a short-term voiceprint feature and a long-term voiceprint feature from the registered speech of the target speaker to obtain a multi-scale voiceprint feature as the speaker feature of the target speaker.

12. The speech recognition apparatus according to claim 10, wherein the feature extraction module is further configured to: extract, by using the pre-established feature extraction model, the speech feature of the target speaker from the speech feature of the target mixed speech, based on the speech feature of the target mixed speech and the speaker feature of the target speaker;

wherein, the feature extraction model is trained, by using a speech feature of a training mixed speech and a speaker feature of a designated speaker, with a speech recognition result obtained based on an extracted speech feature of the designated speaker as an optimization objective, wherein the speech feature of the training mixed speech comprising a speech of the designated speaker, and the extracted speech feature of the designated speaker is a speech feature of the designated speaker extracted from the speech feature of the training mixed speech.

13. The speech recognition apparatus according to claim 10, wherein the speech recognition module is further configured to: obtain the speech recognition result of the target speaker based on the extracted speech feature of the target speaker and a registered speech feature of the target speaker; and wherein the registered speech feature of the target speaker is a speech feature of a registered speech of the target speaker.

14. The speech recognition apparatus according to claim 12, wherein the speech recognition module is further configured to: input a speech recognition input feature at least comprising the extracted speech feature of the target speaker into the pre-established speech recognition model to obtain the speech recognition result of the target speaker;

wherein the speech recognition model is trained, by using the extracted speech feature of the designated speaker, with the speech recognition result obtained based on the extracted speech feature of the designated speaker as an optimization objective.

15. A speech recognition device, comprising a memory and a processor; wherein the memory is configured to store a program; and the processor is configured to execute the program to implement a speech recognition method, the speech recognition method comprising:

obtaining a speech feature of a target mixed speech and a speaker feature of a target speaker;

extracting, by directing the extraction towards a target speech feature, a speech feature of the target speaker from the speech feature of the target mixed speech, based on the speech feature of the target mixed speech and the speaker feature of the target speaker, to obtain the extracted speech feature of the target speaker; wherein the target speech feature is a speech feature for obtaining a speech recognition result consistent with real speech content of the target speaker; and obtaining the speech recognition result of the target speaker based on the extracted speech feature of the target speaker; wherein a feature extraction model and a speech recognition model are pre-established, and joint training is performed on the speech recognition model and the feature extraction model;

wherein the joint training performed on the speech recognition model and the feature extraction model further comprises:

extracting, by using the feature extraction model, the speech feature of the designated speaker from the speech feature of the training mixed speech, to obtain the extracted speech feature of the designated speaker, wherein the training mixed speech corresponds to a speech of the designated speaker;

obtaining the speech recognition result of the designated speaker by using the speech recognition model and the extracted speech feature of the designated speaker;

obtaining an annotated text of the speech of the designated speaker;

obtaining a speech feature of the speech of the designated speaker as a standard speech feature of the designated speaker;

determining a first prediction loss based on the extracted speech feature of the designated speaker and the standard speech feature of the designated speaker;

determining a second prediction loss based on the speech recognition result of the designated speaker and the annotated text of the speech of the designated speaker;

performing the parameter update on the feature extraction model based on the first prediction loss and the second prediction loss; and performing the parameter update on the speech recognition model based on the second prediction loss.

16. A computer readable storage medium storing a computer program thereon, wherein the computer program, when executed by a processor, implements the speech recognition method according to claim 1.

17. The speech recognition method according to claim 4, wherein the process of the extracting, by using the pre-established feature extraction model, the speech feature of the target speaker from the speech feature of the target mixed speech, based on the speech feature of the target mixed speech and the speaker feature of the target speaker comprises:

inputting the speech feature of the target mixed speech and the speaker feature of the target speaker into the feature extraction model to obtain a feature mask corresponding to the target speaker; and extracting the speech feature of the target speaker from the speech feature of the target mixed speech, based on the speech feature of the target mixed speech and the feature mask corresponding to the target speaker.

18. The speech recognition method according to claim 4, wherein the process of obtaining the speech recognition result of the target speaker based on the extracted speech feature of the target speaker comprises:

inputting a speech recognition input feature at least comprising the extracted speech feature of the target speaker into the pre-established speech recognition model to obtain the speech recognition result of the target speaker;

wherein the speech recognition model is trained, by using the extracted speech feature of the designated speaker, with the speech recognition result obtained based on the extracted speech feature of the designated speaker as an optimization objective.

* * * * *